June 29, 1937. J. LOVE 2,085,718
STEERING WHEEL CONTROL FOR MOTOR VEHICLES
Filed July 7, 1933
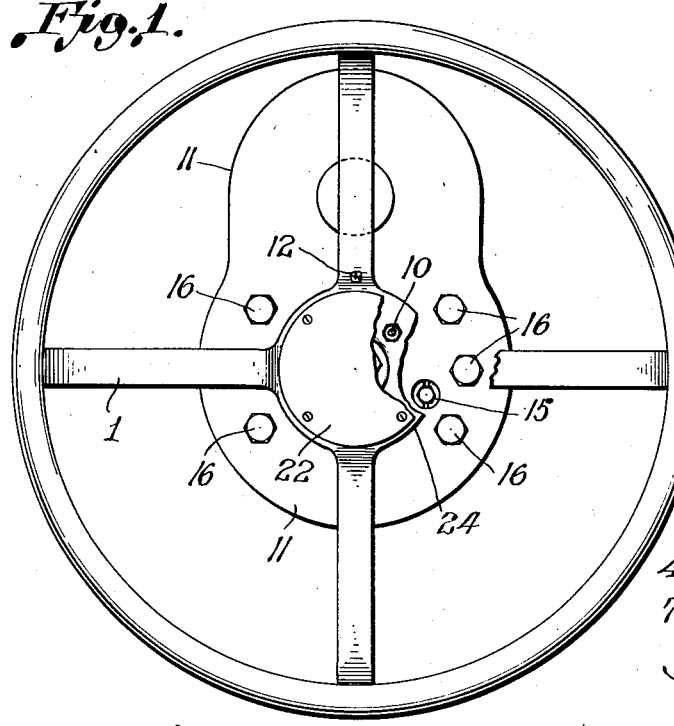
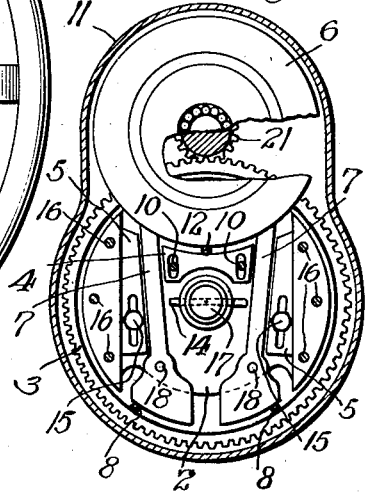
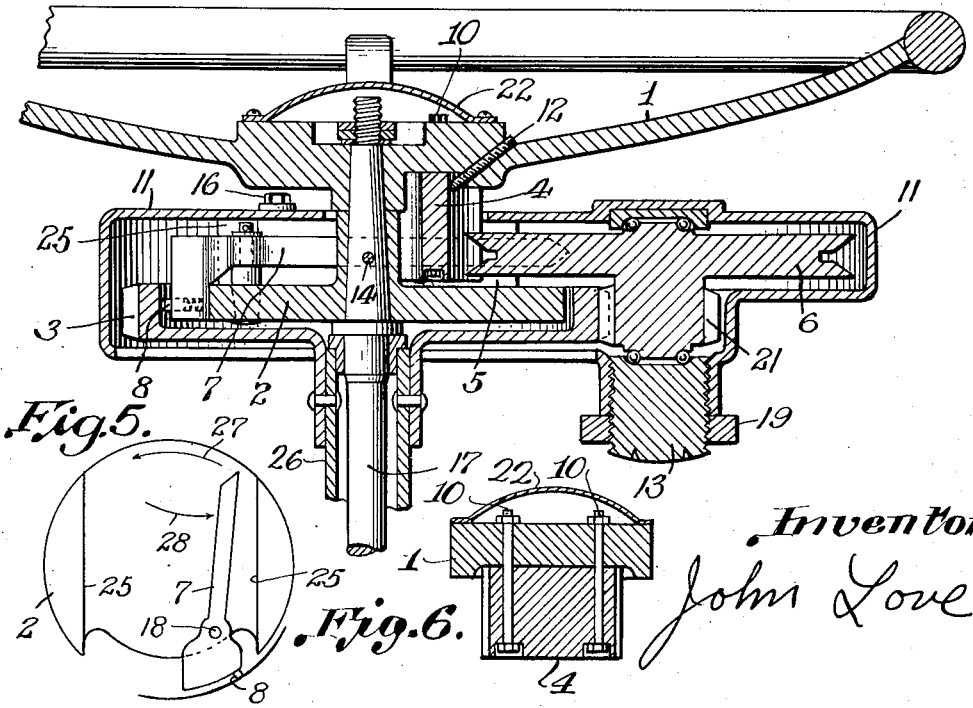
Inventor:
John Love Patented June 29, 1937

2,085,718

UNITED STATES PATENT OFFICE 2,085,718

STEERING WHEEL CONTROL FOR MOTOR VEHICLES

John Love, West Orange, N. J.

Application July 7, 1933, Serial No. 679,276

9 Claims. (Cl. 192—8)

Primarily my invention is a motion valve, a means whereby motion may be freely transferred past a certain point but cannot be returned.

The main object in view is to create a means whereby the operator of a motor vehicle may freely control the direction of travel of the said vehicle yet no irregularities or unequalities on the road surface can deflect or cause the vehicle to stray off the intended course.

Another object of my invention is to provide a means whereby the road wheels used for steering a motor vehicle are held in a locked position at the steering knuckle bolts with respect to the chassis and this position cannot be changed except through the hand steering wheel.

Another object is the elimination of all springs used for the purpose of absorbing the so called road shocks as no such shocks can be delivered to the hand steering wheel, due to the motion valve action heretofore mentioned.

It is a well known fact that a blowout in one of the front wheel tires of a motor vehicle at high speed is dangerous to life and limb due to the fact that the hand steering wheel is snapped from the grip of the operator because of the unexpected occurrence.

Furthermore, if the operator is fully prepared for such an occurrence and holds the hand steering wheel perfectly rigid, yet the shock absorbing springs in the steering system would yield enough to turn the vehicle off the road. With the installation of a motion valved hand steering wheel hereinafter described, all such danger would be eliminated.

Other objects and advantages will be apparent from the following description.

The system contains three major units. First, the hand steering wheel, second, the assembly plate with apparatus hereinafter described mounted thereon, third, the fixed master gear which is fastened rigidly to the steering column or may be a part thereof; the said steering column being fastened rigidly to the chassis of the vehicle, thus the said fixed master gear is rigidly fastened indirectly to the chassis of the said vehicle.

In the drawing Figure 1 shows a top plan of the hand steering wheel with part of the top plate 22 and hub 24 removed showing the nut of the adjusting bolts 10 and the head of one of the adusting bolts 15.

Figure 2 is a top plan with the hand steering wheel 1 and the upper part of the housing 11 removed, showing the assembly plate 2 upon which is mounted two balanced jamming arms 7 and 7, two tapered buttress bars 5 and 5, also said housing 11 upon which is mounted the grooved planetary control wheel 6.

Figure 3 is a side view of the assembly plate 2 with all the apparatus removed therefrom.

Figure 4 is an enlarged sectional view of the complete assembly.

Figure 5 is a diagram portraying a movement which is vital to the success of this invention.

Fig. 6 shows the hub of the hand steering wheel 1 and the driving anvil 4 cut in section at bolts 10.

Referring to the drawing, the hand steering wheel 1 is mounted turnably on the main steering shaft 17, the adjustable driving anvil 4 is fastened to the said hand steering wheel by means of the bolts 10 passing through elongated holes in the said driving anvil thence through the said hand steering wheel with the clamping nuts on top accessible by the removal of the top plate 22, the adjusting screw 12 being used as a variable stopping element for the said driving anvil during the procedure of adjustment thereby greatly simplifying same.

The assembly plate 2 is concentrically fastened rigidly to the main steering shaft 17 by means of the tapered pin 14. The grooved planetary control wheel 6 is ball bearing mounted on the housing 11, which housing is fastened rigidly to the said assembly plate 2 by means of bolts 16. The two balanced jamming arms 7 and 7 are pivoted at their exact centers of balance and said pivots 18 and 18 are mounted eccentrically upon the said assembly plate 2. Each of the said balanced jamming arms 7 and 7 is shaped at one end to fit the groove on the outside of the outer rim of the said grooved planetary control wheel 6 and on the other end of each of the said balanced jamming arms is mounted a drag brush 8 which drags lightly against the smooth surface of the inside of the outer rim of the fixed master gear 3.

The assembly plate 2, Figure 3, is shaped with shoulders 25 and 25 to form stops for the tapered buttress bars 5 and 5, the said tapered buttress bars being held in position at the proper adjustment by means of the clamping bolts 15 and 15. The fixed master gear 3 with teeth on the outside of the outer rim thereof is fastened rigidly to the main steering column 26 or may be a part thereof. The teeth on the said fixed master gear 3 intermesh with the teeth on the small toothed pinion 21 which is part of the said grooved planetary control wheel 6. The bearings of the said grooved planetary control wheel are adjusted by means of the bearing bolt 13 and the clamping nut 19.

It will be observed from the foregoing that in giving a right or left hand rotary motion to the hand steering wheel, the adjustable driving anvil 4 which is fastened to the underneath side thereof pushes one of the balanced jamming arms 7 away from the grooved planetary control wheel 6, thence against the tapered buttress bar 5, pushing said bar which is fastened to the assembly plate 2, thus passing the rotary motion to said assembly plate. The said assembly plate being fastened rigidly to the main steering shaft 17, thus the rotary motion is delivered to the said main steering shaft.

It will also be observed during the above procedure that as the adjustable driving anvil 4 pushes one of the balanced jamming arms 7 away from the planetary control wheel 6, etc. the other balanced jamming arm will turn planetarily with the whole assembly but will endeavor to maintain its own longitudinal position by reason of its own inertia plus the assistance of the drag brush 8 until the adjacent tapered buttress bar 5 comes in contact with the said balanced jamming arm and carries it along with the rest of the assembly.

This movement which is vital to the success of this invention is more clearly portrayed in Figure 5. A wheel 2 carries a rod or arm 7 constructed so that its exact center of balance will be near one end, said rod or arm being pivoted at that exact center of balance, said pivot 18 being mounted eccentrically upon said wheel 2. If said wheel 2 is rotated in the direction of the arrow 27, the rod or arm 7 will move in the direction of the arrow 28. If a brushing device is fastened on the said rod or arm at 8 and drags on some stationary object, it will augment that movement.

It will also be observed that in an attempt to give a right or left hand rotary motion directly to the steering shaft 17, a slight movement will take place in the assembly plate 2, carrying the grooved planetary control wheel 6 against one of the balanced jamming arms 7, thereupon a wedging or jamming effect will take place stopping the planetary control wheel 6 from revolving upon its own bearings, thus locking the assembly plate 2 and its mountings plus said steering shaft 17 with the fixed master gear 3.

The movement of the above mentioned balanced jamming arm during the above procedure is a very important one and is more easily understood by reference to Figure 5. If wheel 2 is rotated in the direction opposite to that which is shown by the arrow 27 the rod or arm 7 will move in a direction reverse to that which is shown by the arrow 28. A study of this will show that during the procedure under discussion the said balanced jamming arm 7 actually travels towards the said planetary control wheel 6 thus reducing the play in the said steering shaft 17 to less than the actual adjustment of the sliding buttress bars 5 and 5, and furthermore it will be observed that the balanced jamming arms 7 and 7 cannot touch, rub, or otherwise come in contact with the said planetary control wheel 6 unless said steering shaft 17 attempts to rotate in an unintended direction.

It is obvious that various modifications may be made in the apparatus herewith described and although I have selected the hand steering wheel for the location of my invention, it is possible to locate said invention in various places in the steering system and not impair its efficiency, and furthermore although described herewith as a steering system its principles may be used for other purposes.

I claim:

1. In an apparatus of the class described, a hand steering wheel turnably mounted on a steering shaft, an adjustable driving anvil fastened to the underneath side of the said hand steering wheel, an assembly plate fastened concentrically to the said steering shaft, a fixed master gear with teeth on the outer rim thereof, said fixed master gear being rigidly fastened to a fixed steering column, said steering column forming a housing for the said steering shaft.

2. In an apparatus of the class described, an assembly plate, a housing fastened upon said assembly plate, a grooved planetary wheel mounted upon said housing eccentric with said assembly plate, a fixed gear with teeth on the outside of the outer rim thereof, a small toothed pinion fastened to the said grooved planetary wheel, the teeth on the said fixed gear intermeshing with the teeth on the said small toothed pinion.

3. In an apparatus of the class described, a housing fastened upon an assembly plate, a grooved planetary wheel mounted upon said housing eccentric with said assembly plate, two balanced rods or arms with their respective pivots mounted eccentrically upon said assembly plate, each of the said rods or arms being shaped on one end to fit the groove on the outside of the outer rim of the said grooved planetary wheel.

4. In an apparatus of the class described, a fixed gear with a smooth surface on the inside of the outer rim thereof, an assembly plate fastened concentrically upon a steering shaft, two rods or arms pivoted at their exact centers of balance, said pivots being mounted eccentrically upon said assembly plate, a brushing device mounted on one end of each of the said rods or arms which drags upon the smooth surface of the inside of the outer rim of the said fixed gear, the purpose of which being to augment the action of the said rods or arms in endeavoring to maintain their own longitudinal position by reason of their own inertia irrespective of the movements of the said assembly plate with respect to the said fixed gear.

5. In an apparatus of the class described, an assembly plate shaped to form shoulders or stops for two tapered buttress bars, said tapered buttress bars being adjustable upon said assembly plate by means of a bolt passing through an elongated hole in each of the said tapered buttress bars, thence threaded into the said assembly plate.

6. In an apparatus of the class described, a hand steering wheel, a driving anvil adjustable upon said hand steering wheel by means of bolts passing through elongated holes in the said driving anvil thence through the said hand steering wheel, an adjusting screw mounted in said hand steering wheel to be used for fine adjustment of said driving anvil before bolting said driving anvil rigidly to said hand steering wheel.

7. In an apparatus of the class described, an assembly plate, a grooved planetary wheel, two balanced rods or arms, one end of each of the said balanced rods or arms being shaped to fit the groove in the outside of the outer rim of the said grooved planetary wheel, said grooved planetary wheel and said balanced rods or arms being so mounted upon or with respect to the said assembly plate that the said balanced rods or arms can jam or wedge in or against the groove in the outside of the outer rim of the said grooved planetary wheel and stop or prevent said grooved planetary wheel from rotating when the occasion requires.

8. In an apparatus of the class described, an assembly plate, a fixed element, two rods or arms pivoted at their exact centers of balance and off their geometrical centers, said pivots being mounted eccentrically upon said assembly plate, a brushing device fastened to one end of each of the said rods or arms which draggingly contacts the said fixed element.

9. In an apparatus of the class described, a mechanical movement comprising a wheel, a rod or arm pivoted at its exact center of balance and eccentrically upon said wheel, said rod or arm being planetarily rotatable with said wheel but being permitted to endeavor to maintain its own longitudinal position by reason of its own inertia, a brushing device fastened to one end of the said rod or arm which draggingly contacts a stationary object.

JOHN LOVE.